US011879373B2

(12) United States Patent
Sandberg et al.

(10) Patent No.: US 11,879,373 B2
(45) Date of Patent: Jan. 23, 2024

(54) EXHAUST AFTER TREATMENT SYSTEM AND METHOD FOR PRE-HEATING A CATALYTIC CONVERTER

(71) Applicant: Volvo Car Corporation, Gothenburg (SE)

(72) Inventors: Peter Sandberg, Gothenburg (SE); Mats Laurell, Gothenburg (SE); Niklas Löfgren, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/071,717

(22) Filed: Nov. 30, 2022

(65) Prior Publication Data
US 2023/0175423 A1    Jun. 8, 2023

(30) Foreign Application Priority Data

Dec. 2, 2021 (EP) .................................. 212121040

(51) Int. Cl.
*F01N 3/20* (2006.01)
*F01N 13/00* (2010.01)
*F01N 3/32* (2006.01)

(52) U.S. Cl.
CPC ......... *F01N 3/2013* (2013.01); *F01N 13/009* (2014.06); *F01N 3/2006* (2013.01);
(Continued)

(58) Field of Classification Search
CPC ........ F01N 3/2006; F01N 3/2093; F01N 3/32; F01N 3/2013; F01N 13/009; F01N 2240/16; F01N 2560/06
See application file for complete search history.

(56) References Cited

U.S. PATENT DOCUMENTS

2020/0165949 A1* 5/2020 Laube ..................... F02B 37/10
2021/0148269 A1* 5/2021 Ellmer .................... F01N 3/035
(Continued)

FOREIGN PATENT DOCUMENTS

DE  102019216779 A1  5/2021
FR      3100275 A1  3/2021
FR      3101112 A1  3/2021

OTHER PUBLICATIONS

Apr. 26, 2022 European Search Report issued in Corresponding International Application No. 21212104.

*Primary Examiner* — Brandon D Lee
(74) *Attorney, Agent, or Firm* — Clements Bernard Walker; Christopher L. Bernard

(57) ABSTRACT

An exhaust after treatment system for a vehicle includes an exhaust outlet pipe, having a first end that is connectable to a vehicle engine, for receiving exhaust gases from said vehicle engine, and having an outlet opening at a second end, arranged to eject the outlet gases, a catalytic converter, connected to the exhaust outlet pipe; and an electric heater element which is in heat conducting contact with the catalytic converter and adapted for pre-heating the catalytic converter. The heater element is positioned downstream of the catalytic converter with respect to the first end. Upon the vehicle being started, the heater element is switched on and gases are flowed from the second end, in the direction of the first end of the exhaust outlet pipe, through the catalytic converter for a pre-set period of time prior to passing exhaust gases from the engine towards the outlet opening at the second end.

12 Claims, 3 Drawing Sheets

(52) U.S. Cl.
CPC .............. *F01N 3/2093* (2013.01); *F01N 3/32* (2013.01); *F01N 2240/16* (2013.01); *F01N 2560/06* (2013.01)

(56) References Cited

U.S. PATENT DOCUMENTS

| | | | |
|---|---|---|---|
| 2021/0340895 A1* | 11/2021 | Hall | F01N 3/2013 |
| 2022/0178290 A1* | 6/2022 | Gaiser | F01N 3/021 |
| 2022/0235684 A1* | 7/2022 | Zhang | F02D 41/0255 |

* cited by examiner

EXHAUST AFTER TREATMENT SYSTEM AND METHOD FOR PRE-HEATING A CATALYTIC CONVERTER

CROSS-REFERENCE TO RELATED APPLICATION

The present disclosure claims the benefit of priority of co-pending European Patent Application No. 21212104.0, filed on Dec. 2, 2021, and entitled "Exhaust After Treatment System and Method for Pre-Heating a Catalytic Converter," the contents of which are incorporated in full by reference herein.

TECHNICAL FIELD

The present disclosure relates to an Exhaust After Treatment System, EATS, for a vehicle, including an exhaust outlet pipe, having a first end that is connectable to a vehicle engine, for receiving exhaust gases therefrom and having an outlet opening at a second end, arranged to eject outlet gases into the ambient air, a catalytic converter, connected to the exhaust outlet pipe, and an electric heater element which is in heat exchanging contact with the catalytic converter and adapted for pre-heating the catalytic converter. The disclosure further relates to a method of pre-heating the catalytic converter.

BACKGROUND

Emission laws are becoming more and more stringent, enforcing the development of vehicles with internal combustion engines having further reduced emissions during use. Since many years, emissions from tailpipe exhaust gases are reduced by a catalytic convertor present in between the tailpipe connection to the engine and the tailpipe outlet. A high temperature is essential for the chemical reactions in the catalytic converter to be fast enough to convert the majority of the pollutants created by the engine. As a result, vehicles fitted with catalytic convertors emit most of their total amount of pollutants during the first five minutes of engine operation, i.e. before the catalytic converter has warmed up sufficiently reach light off and to be fully effective. Thus to create a low emission system, a large enough portion of the catalytic converter must be sufficiently heated before it is reached by the exhaust gases.

In order to lower emissions, catalytic converter assemblies have been introduced with heating coils inside the catalytic converter, which heating coils are electrified just after the vehicle is turned on and/or just after the engine is started, bringing the catalytic converter up to operating temperature very quickly to reduce the emitted pollutants.

In a known configuration, a heating element, specifically a heating disk, is disposed upstream of the auxiliary catalytic converter in the flow direction of the exhaust gases through the exhaust duct. The known heater element is placed directly inside the exhaust after treatment system (EATS) and forms the element of the catalytic converter which is closest to the engine.

A disadvantage of this placement is that the heater element is situated in a position which is most exposed to aging, due to continuous high temperatures from the engine, as well as temperature peaks from misfire, residues from oil and unfiltered exhaust gases. Furthermore, although the catalytic converter heats up more speedily through the use of the heating disk, a heating phase of around 20 seconds still remains, during which the catalytic converter is not fully effective in removing pollutants from the engine exhaust fumes that pass through the catalytic converter during this phase.

In another known configuration, air/gas is being circulated through an exhaust post-treatment system via a circulation line, in which both an air pump and an electric heater are located. After the vehicle is turned on, a monitoring and control module issues a heating control command, which causes a first electromagnetic valve to close, closing off a duct between the engine and the exhaust post-treatment system, and a second electromagnetic valve to open, such that the exhaust post-treatment system is in fluid connection to a heating circulation line and forms a circuitry with the exhaust pipe. In the circuit, then the high temperature resistant circulating air pump begins to operate, and the electric heater is energized to heat.

A disadvantage of this latter system is that the additional ducts leads to a relatively bulky system which needs to be included in the vehicle design somehow. Furthermore, the additional ducts lead to heat losses, thereby wasting energy and resulting in a relatively long time until the catalytic converter is heated up sufficiently.

There is a need to provide an exhaust after treatment system for vehicles which further reduces pollutants emitted through exhaust gases.

Furthermore, there is a need to provide an exhaust after treatment system for vehicles in which one or more of the abovementioned disadvantages have been resolved.

SUMMARY

According to the present disclosure, the heater element of the exhaust after treatment system (EATS) is positioned downstream of the catalytic converter with respect to the first end, the exhaust after treatment system being adapted to, upon the vehicle being started, switch on the heater element and flow gases from the second end, in the direction of the first end of the exhaust outlet pipe, through the catalytic converter for a pre-set period of time prior to passing exhaust gases from the engine towards the outlet opening at the second end.

By placing the heater element downstream of the catalytic converter, it is protected from the high engine out temperature peaks, misfires and metals originating from oil. The heater element is in close proximity to the catalytic converter, allowing the catalytic converter to be heated by the heater element through radiation. Furthermore, since the EATS is adapted to suck back gases towards the engine upon the vehicle being started, the gases passes through the heater element prior to passing through the catalytic converter and heat up the catalytic converter by convection, increasing the efficiency of the heat transfer and drying out the catalyst. The drying out of the catalyst is also of advantage for the conversion of start emissions.

The heating of the catalytic converter is started prior to ignition of the engine, so that the catalytic converter is heated up, preferably close to its light-off temperature, before the first exhaust gases pass through it.

The gases that are sucked back towards the engine may include ambient air and/or crank emissions and engine exhaust gases from a previous engine on event, which are already present in the catalytic converter and in the exhaust outlet pipe upon starting of the vehicle. Sucking back of gases for a pre-set period of time prior to passing exhaust gases from the engine to the outlet opening, prevents these exhaust gases from passing the catalytic converter before it has sufficiently heated up. This results in a substantial reduction of the amount of harmful emissions exiting the outlet opening.

The pre-set period of time may be less than 30 seconds, preferably less than 20 seconds, most preferred of less than 15 seconds.

It should be noted that, during the pre-set period of time during which gases flow back in the direction of the engine, the engine cannot yet be running. However, due to the positioning of the heater element, the catalytic converter is heated up both through radiation and convection, so that the heating-up phase is efficient and the pre-set period of time can be relatively short, allowing the engine to start quickly after switching on the vehicle. Preferably, the pre-set period of time is based on model and/or test-data for the temperature of the catalytic converter. This test-data determine the amount of time that is required to fill the catalytic converter upstream from the heater element with hot gas. A typical heating time may be between 10 and 30 seconds.

A temperature sensor may be provided for sensing a temperature in the exhaust outlet pipe and/or the catalytic converter, the pre-set period of time being based on a pre-set temperature value sensed by the temperature sensor.

The temperature that is sensed may be the direct temperature of the catalytic converter, or another temperature within the exhaust system, such as for example the gas temperature near the first end of the exhaust outlet pipe.

An internal volume between the first end of the exhaust outlet pipe and the catalytic converter may be adapted to accommodate the volume of gases flowed from the second end through the heater element during the pre-set period of time.

For example, when the catalytic converter volume is 1 liter and the pipe volume between catalytic converter and the heater element is 0.5 liter, 1.5 liters of gases need to be transported in the upstream direction (ignoring the increase volume of hotter gas) in order to fill the pipe and the catalytic converter with heated air that has been passed through the heater element. In this case, the volume of the exhaust outlet pipe that is situated upstream of the catalytic converter needs to accommodate at least 1.5 liters of gases.

The volume of the gases that need to be sucked back in order to sufficiently heat up the catalytic converter, may not be larger than the volume of the catalytic converter. However, by evacuating gases from the exhaust system as far upstream from the catalytic converter as possible, more heated gases are pumped through the catalytic converter, thereby exposing it to more heat and heating it to higher temperatures prior to the engine starting. Hence the heating effect is increased when the internal volume of the exhaust outlet pipe system between the first end and the catalytic converter is larger than the internal volume of the catalytic converter and any piping present between the catalytic converter and the heater element.

An internal volume between the first end and the catalytic converter may be smaller than the volume of the catalytic converter. Preferably this volume is sufficiently large to accommodate the heated gases that pre-heat the catalyst, preferably to a temperature near light-off.

This allows substantially all gases that are sucked back being retained within the EATS. As a result, the EATS can be kept relatively compact, e.g. no space needs to be reserved in the vehicle design for accommodating additional piping that would be required for a by-pass loop.

The exhaust after treatment system may include a gas pump which is with an inlet connected to the exhaust outlet pipe section at or near the first end and arranged to pump gas in an upstream direction from the second end to towards the first end of the exhaust outlet pipe.

Since the gas pump is only active during the pre-set period of time before the engine starts running and the pump is placed at a distance from the heater element, the pump does not have to withstand high temperatures. In particular, when the internal volume between the first end of the exhaust pipe and the heater element is sufficiently large to hold the volume of heated gas that is pumped upstream during the pre-set period of time, no heated gases need to pass through the pump. As a result, a special pump capable of withstanding high temperatures is not required and a conventional pump may be utilized instead. Such a conventional pump is of reduced complexity compared to high temperature pumps and the resulting EATS can be made at lower costs.

The pump may with an outlet be connected to the section of the exhaust outlet pipe downstream from the heater element.

A second catalytic converter may be placed downstream from the heater element, between said heater element and the second section of the exhaust outlet pipe.

The second catalytic converter during operation of the engine while exhaust gases flow from the first end toward the second end of the EATS, further reduces the amount of emissions.

The gas pump outlet may be situated either upstream or downstream of this second catalytic converter. If the outlet is situated upstream of the second catalytic converter, any air/gas that is recirculated into the exhaust outlet pipe by the gas pump is passed along the second converter prior to exiting the EATS.

The gas pump may include a bi-directional pump which is further connected to the exhaust outlet pipe at a position between the electric heater element and the second catalytic converter and adapted to pump gases in the upstream direction from the heater element towards the first end as well as in a downstream direction from the heater element to the second catalytic converter.

As a result, the second catalytic converter can be pre-heated using a single electric heater element and pump.

The EATS may further include a vacuum canister which is in fluid connection with a first section of the exhaust outlet pipe between the first end and the catalytic converter, said vacuum canister being arranged to store gases flowing from the second end towards the first end of the exhaust outlet pipe during the pre-set period of time and adapted to release the stored gases in a controlled manner when exhaust gases from the engine are flowing toward the outlet opening.

The canister provides an additional storage volume for gases that are sucked back into the EATS in the pre-set period of time between the starting of the vehicle and the firing of the first cylinder on starting of the engine, ensuring that a sufficient amount of gases can be accommodated. The canister is arranged such that no gases are released into the ambient air. When the pre-set time period has passed and the engine is ignited, the stored gases are released from the canister in a controlled manner, such that a mixture is obtained of stored gases and exhaust gases that are generated during the combustion cycle, which has a pollutant content within a predetermined boundary within which the catalytic converter can remove pollutants efficiently.

The canister may be used without a heating element being present in the exhaust after treatment system, in which case the air is sucked into the canister when the engine first starts moving and gas intake is stopped when the first cylinder is ignited. This sucking up of crank emissions and residual emissions from a previous engine on cycle prior to start of the engine, followed by controlled release of the accumulated residual gases, provides a lowering of the emissions.

The vacuum canister may be provided with a control valve in the fluid connection between said canister and the exhaust outlet pipe, said control valve being adapted for releasing gases from the vacuum canister into the exhaust outlet pipe in a controlled manner.

The gas pump may be connected to the exhaust outlet pipe via the vacuum canister.

This allows a relatively small gas pump to be used, since the gas pump is mainly required to generate the vacuum inside the vacuum canister. This vacuum is generated during the running of the engine in the previous engine on event, e.g. before the vehicle has been switched off and then on again, or from crank. The vacuum in this case provides the main driving force for sucking back gases into the EATS prior to the engine starting. When no control valve is provided in the fluid connection, the gas pump may be set to release the vacuum in a controlled manner after the pre-set time period has lapsed, thereby controllably releasing the gases inside the canister into the exhaust outlet pipe, together with the exhaust gases from the engine.

Use of the vacuum canister without a heater element being present was found to result in significant lowering of emissions, by, upon starting the vehicle, taking in cold crank emissions and residual exhaust gases present within the exhaust outlet pipe. Through controlled release of these cold gases, when the engine is ignited, said gases mix with the warm exhaust gases at the start of emission by the engine prior to passing the catalytic converter, resulting in a lowered output of pollutants.

The heater element may be ring-shaped such that gases flowing through the exhaust outlet pipe are heated from all sides.

The heater element can be provided with a catalyst coating so that it forms part of the catalytic converter, additionally removing pollutants from the exhaust gases. The catalyst coating is typically a mixture of platinum group metals and wash coat consisting of alumina, ceria and other inorganic oxides. The wash coat adheres to the substrate foil and creates a large surface area allowing for catalyst materials (platinum group metals) to be applied.

The method according to the disclosure provides a preheating of the catalytic converter, prior to ignition of the engine, including activating the heater element and flowing gases from the second outlet pipe section along the heater element and the catalytic converter into the first outlet pipe section.

BRIEF DESCRIPTION OF THE DRAWINGS

Embodiments of an exhaust after treatment system according to the disclosure will be described by way of example, with reference to the attached drawings, in which.

DETAILED DESCRIPTION

Figure 1:
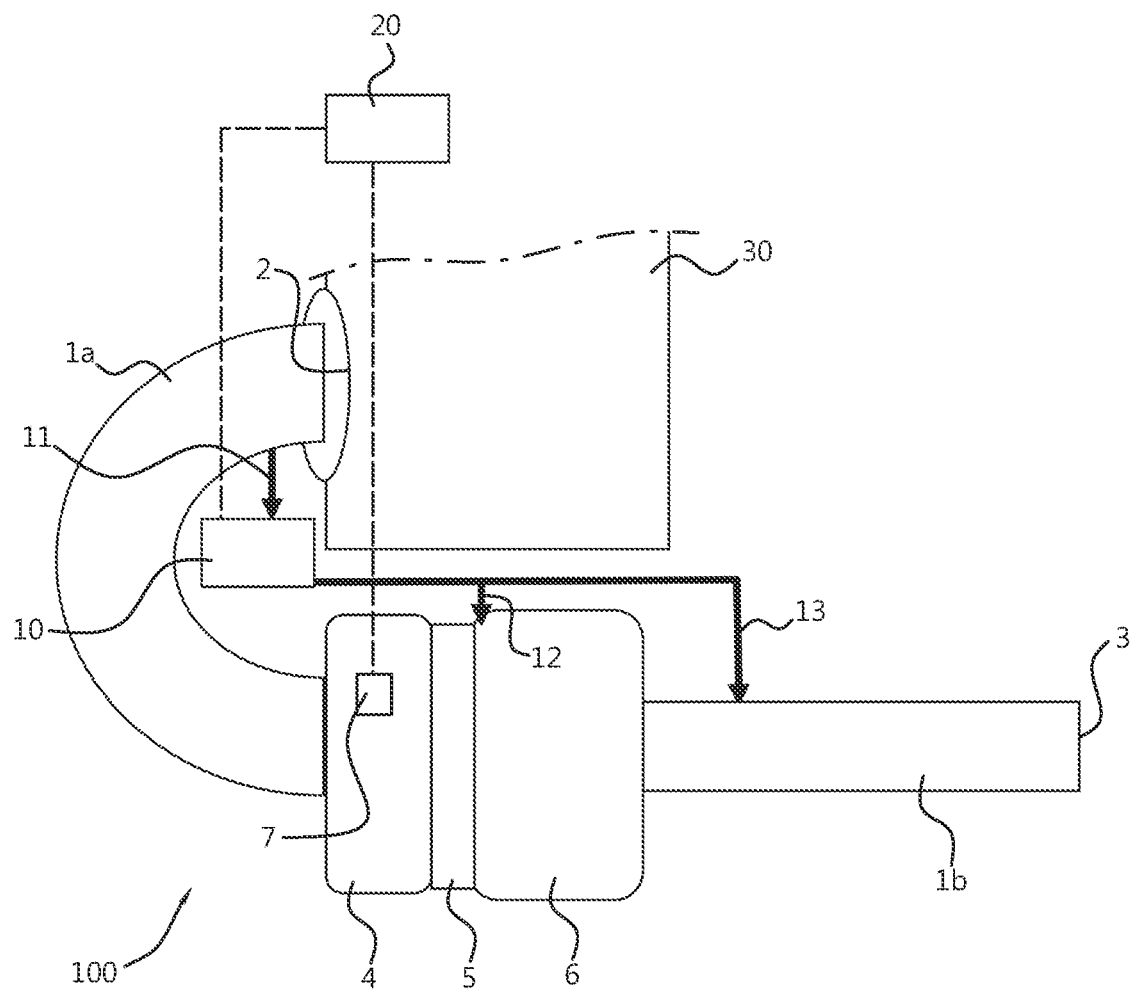
FIG. 1 shows a schematic representation of an EATS according to the disclosure.

FIG. 1 shows a schematic representation of an EATS 100 having an exhaust outlet pipe 1a, 1b, a first catalytic converter 4, a heater element 5, a second catalytic converter 6, a gas pump 10 and a controller 20. The exhaust outlet pipe 1a, 1b is with a first end 2 connected to a vehicle's internal combustion engine (ICE) 30, and has a second end 3 forming an outlet to the ambient environment at a predetermined distance from the engine 3. The exhaust outlet pipe is formed by a first section 1a and a second section 1b, with the first and second catalytic converters 4, 6 and the heater element 5 located in between said first and second sections 1a, 1b, forming a closed piping system that extends from an outlet opening of the engine 30 to the second end 3 forming the outlet. Under regular exhaust flow conditions as a point of reference when the engine 30 is the source of gases flowed through the exhaust outlet pipe 1a, 1b, the electric heater element 5 is considered as located downstream of the first catalytic converter 4 and upstream of the second catalytic converter 6.

The gas pump 10 is with an inlet 11 connected to the first section 1a of the exhaust outlet pipe, at or close to the first end 2, and is depicted with a first outlet 12 connected to the second catalytic converter 6 and with a second outlet 13 to the second section 1b of the exhaust outlet piping. It should be noted that from a technical point of view, neither outlet 12, 13 is required and any gas expelled from the pump could be ejected in the engine bay of the vehicle. However, regulations may require that gases expelled by the pump 10 are let out via the outlet 3 of the exhaust outlet pipe, such that at least one of the two depicted outlets 12, 13 are in such a case required. When both the first and second outlet 12, 13 are included in the EATS, the outlets 12, 13 may be formed as independent outlets, or the outlets 12, 13 may be combined in a joined outlet having independent branches connecting to the second catalytic converter 6 and the second section 1b respectively.

Both the gas pump 10 and the electric heater element 5 are in communication with the controller 20. The controller 20 may be part of the engine management system or can form a separate module. The controller 20 is adapted to, upon the vehicle being started, switch on the heater element 5 and the gas pump 10, prior to the engine 30 being ignited. As a result, gases, including residual engine exhaust gases from a previous vehicle use event and ambient air, are sucked back into the exhaust outlet pipe sections 1a, 1b, flowing towards the engine 3, in opposite direction from any engine exhaust gases flowing through during engine-on events. As a result, gases are first heated up by the heater element 5, prior to passing through the first catalytic converter 4, such that the first catalytic converter 4 is heated both by the passing gases, as well as by direct heating through radiation from the heater element 5 being directly adjacent.

The controller 20 is adapted to activate the gas pump 10 for a pre-set period of time prior to engine ignition, during which no heated gases flow through the gas pump 10. Hereto, the combined volumes of the first section 1a of the exhaust outlet pipe and the first catalytic converter 4 are designed to be sufficiently large to hold an amount of gas pumped in during the pre-set period of time, which amount is sufficient to heat up the first catalytic converter to light-off temperature. The required internal volume and gas flow have been determined through modelling and/or testing. The pre-set period of time also follows from said modelling and/or testing, and may be used directly as a pre-set value by the controller 20. Alternatively or additionally, a temperature sensor 7 may be included in the EATS, for example on the first catalytic converter 4 or at the position of the gas pump 10, and the controller 20 can be adapted to stop the gas pump 10 once a pre-set temperature is measured by the sensor 7. After de-activating of the pump 10, the engine 30 is ignited and exhaust gases pass through the exhaust outlet pipe sections 1a, 1b flowing towards the outlet 3.

The second catalytic converter 6 is an optional element, which may or may not be present, depending on particular design requirements and/or regulations. Alternatively, the EATS may be fitted with additional catalytic converters adjacent the first and/or second catalytic converters 4, 6.

Optionally, and not depicted, one or more valves may be included in the inlet 11 and/or outlets 12, 13 of the gas pump 10, which may also be controllable by the controller 20 and set in an open position when the gas pump 10 is on and in a closed position when the gas pump 10 is off.

Figure 2:
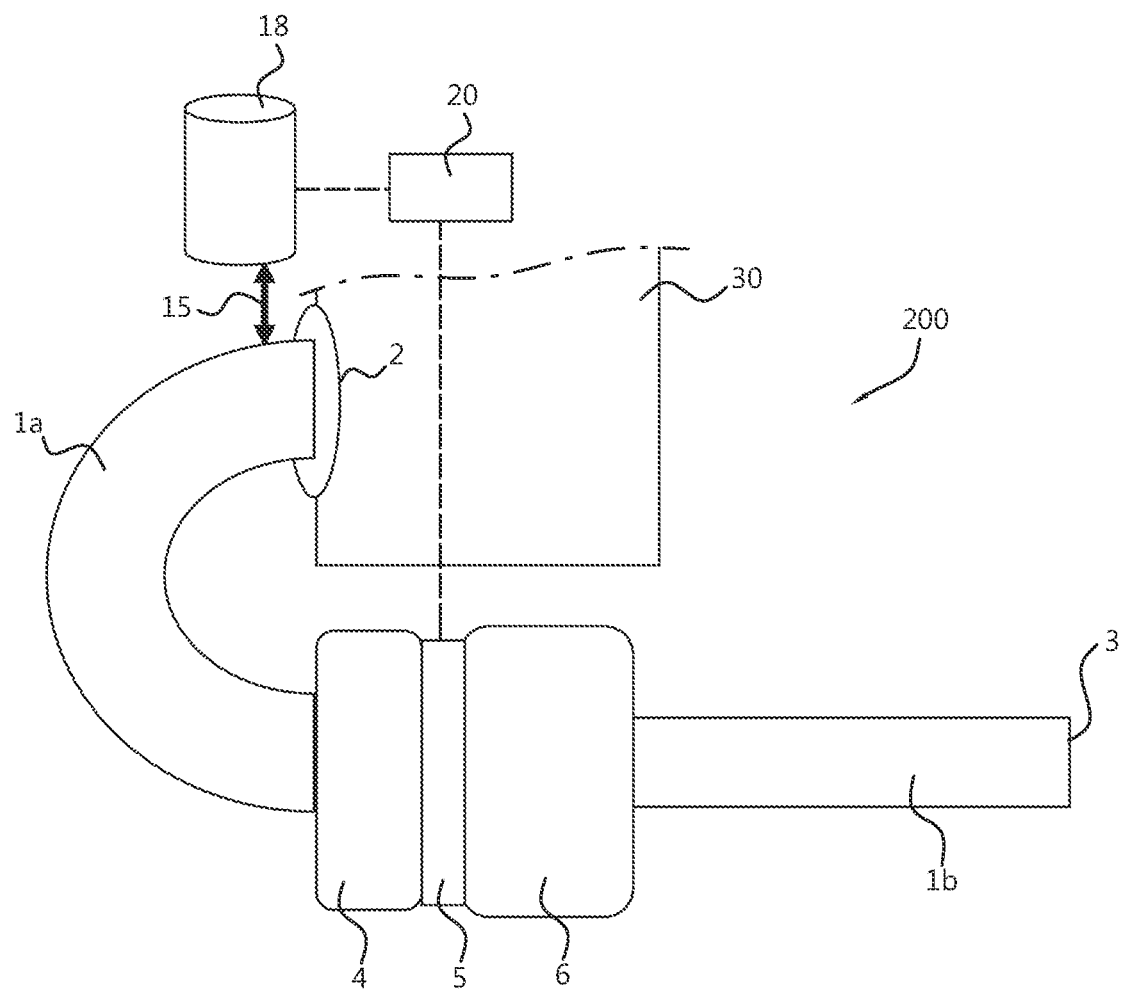
FIG. 2 shows a schematic representation of an EATS including a vacuum canister.

FIG. 2 shows a schematic representation of an EATS 200 according to a second embodiment of the present disclosure. The EATS 200 has a vacuum canister 18 instead of the gas pump 10 shown in FIG. 1. Thus the first and second sections 1a, 1b of the exhaust outlet pipe, with the first and (optional) second catalytic converters 4, 6 and the heater element 5 between the first and second sections 1a, 1b, form a closed piping system extending from an outlet opening of the engine 30 at the first end 2 to the second end 3 forming the exhaust outlet. The vacuum canister 18 is connected to the first section 1a near the first end 2 via a two-way fluid connection 15. The controller 20 is in communication with the heater element 5 and the vacuum canister 18, which vacuum canister 18 is provided with one or more valves (not shown) which are operable by the controller 20.

Upon the vehicle being started and prior to the engine 30 being ignited, the controller 20 switches on the heater element 5 and opens a valve in the vacuum canister 18, in which a vacuum exists, such that gas is sucked into the canister 15 due to the vacuum. As a result thereof, gases, including residual engine exhaust gases from a previous vehicle use event and ambient air, are sucked back into the exhaust outlet pipe sections 1a, 1b, flowing in opposite direction from any engine exhaust gases flowing through during engine-on events. The gases are then first heated by the heater element 5, prior to passing through the first catalytic converter 4, such that the first catalytic converter is heated up by the passing gas, as well as by direct heating through radiation from the heater element 5 being directly adjacent.

The canister 18 forms a closed volume, such that no gases are released into the ambient air. The internal volume of the canister 18 is chosen to be sufficiently large to suck in a sufficient volume of gases during the predetermined period of time for the pre-heating of the first catalytic converter 4. The internal volume of the canister 18 is equal to or larger than an internal volume of the first catalytic converter 4, which may have a volume of approximately 3 L or more.

The controller 20 allows the engine 30 to start when the pre-determined period of time has lapsed and controls a valve in the vacuum canister 18 to release the gases now stored in the canister in a controlled manner back into the exhaust outlet pipe section 1a, such that the released gases mix with the exhaust gases from the engine 30, prior to passing through the now heated first catalytic converter 4 for removal of pollutants therefrom. The EATS 200 is adapted to restore the vacuum conditions inside the vacuum canister 18 upon the release of the stored gases, and to maintain vacuum conditions until the vehicle is restarted and a new pre-heating cycle of the first catalytic converter 4 is commenced.

Figure 3:
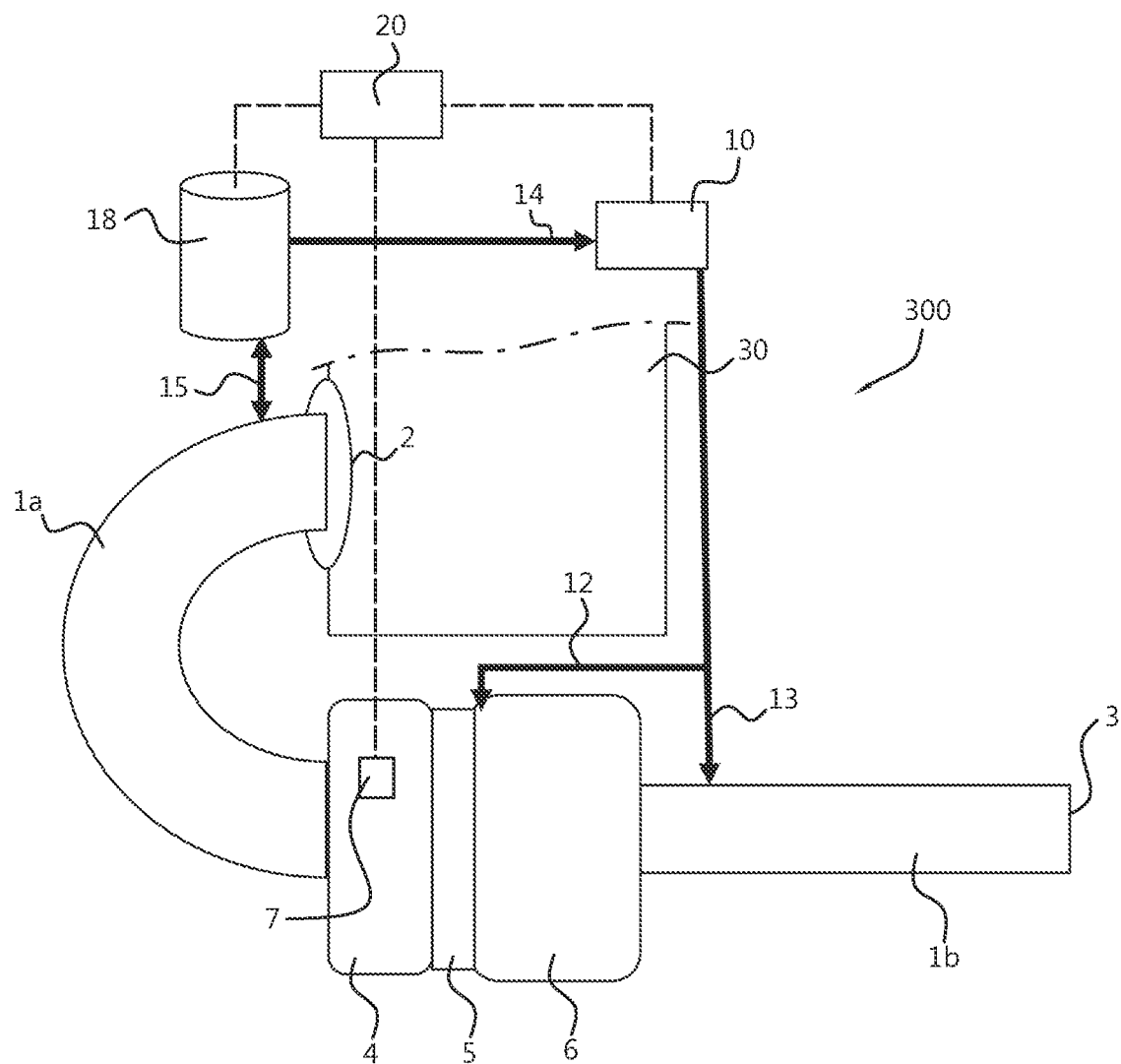
FIG. 3. Shows a schematic representation of an EATS including a gas pump and a vacuum canister.

FIG. 3. shows a schematic representation of an EATS 300 according to a third embodiment of the present disclosure. The EATS 300 has a combination of the features of EATS of FIG. 1 and the EATS of FIG. 2. Thus the EATS 300 has first and second exhaust outlet pipe sections 1a, 1b, a first catalytic converter 4, a heater element 5, an optional second catalytic converter 6, a controller 20, and a gas pump 10 as well as a vacuum canister 18. The first and second sections 1a, 1b, the first and second catalytic converters 4, 6 and the heater element 5 form a closed piping system extending from an outlet opening of the engine 30 at the first end 2 to the second end 3 forming the outlet.

The vacuum canister 18 is connected to the first section 1a of the exhaust outlet pipe, near the first end 2, via the two-way fluid connection 15. The gas pump 10 is with an inlet 14 connected to the internal volume of the vacuum canister 18, and is with a first outlet 12 connected to the second catalytic converter 6 and with a second outlet 13 to the second section 1b. The controller 20 is connected via control lines to the heater element 5, the gas pump 10 and to the vacuum canister 18.

When the vehicle is started and prior to the engine 30 turning on, the controller 20 switches on the heater element 5 and opens a valve (not shown) in the two-way fluid connection 15 of the vacuum canister 18, in which a vacuum exists, such that gas is sucked into the canister 15. The gas pump 10 may also be switched on, to further increase the suction by the vacuum canister 18, thereby speeding up the rate at which gases flow in the upstream direction through the first catalytic converter 4.

The controller 20 allows the engine 30 to start after a pre-determined period of time has lapsed, which period is either a pre-set time or the interval in which a pre-set temperature is reached and measured by the temperature sensor 7. After ignition of the engine, the controller 20 releases the stored gases from the canister 18 in a controlled manner back into the exhaust outlet pipe section 1a through the gas pump 10 running in the opposite direction, pumping gas from the vacuum canister 18 via the inlet 14. The pump 10 restores the vacuum conditions inside the vacuum canister 18 after the release of the stored gases and closing of a valve in the two-way fluid connection 15 of the vacuum canister 18 to the first section 1a of the exhaust outlet pipe. The vacuum conditions in the canister are maintained until the vehicle is restarted and a new pre-heating cycle of the first catalytic converter 4 is commenced.

The invention claimed is:

1. An exhaust after treatment system for a vehicle, comprising:
   an exhaust outlet pipe, having a first end that is connectable to a vehicle engine, for receiving exhaust gases from said vehicle engine, and having an outlet opening at a second end, arranged to eject the outlet gases,
   a catalytic converter, connected to the exhaust outlet pipe,
   an electric heater element which is in heat exchanging contact with the catalytic converter and adapted for pre-heating the catalytic converter,
   a vacuum canister which is in fluid connection with a first section of the exhaust outlet pipe between the first end and the catalytic converter, said vacuum canister being arranged to store gases flowing from the second end towards the first end of the exhaust outlet pipe during a pre-set period of time and adapted to release the stored gases in a controlled manner when exhaust gases from the engine are flowing toward the outlet opening,
   the heater element being positioned downstream of the catalytic converter with respect to the first end, and the exhaust after treatment system being adapted to, upon the vehicle being started, switch on the heater element and flow gases from the second end, in the direction of the first end of the exhaust outlet pipe, through the catalytic converter for the pre-set period of time prior to passing exhaust gases from the engine towards the outlet opening at the second end, wherein the vacuum canister is provided with a control valve in the fluid connection between said canister and the exhaust outlet pipe, said control valve being adapted for releasing gases from the vacuum canister into the exhaust outlet pipe in a controlled manner, wherein the pre-set period is when the vehicle is started and prior to the engine turning on, and a controller activate the heater element and opens the control valve in the first section of the exhaust outlet pipe such that gas is sucked into the canister during the pre-set period.

2. The exhaust after treatment system according to claim 1, the pre-set period of time being less than 30 seconds.

3. The exhaust after treatment system according to claim 1, further comprising a temperature sensor for sensing a temperature in the exhaust outlet pipe and/or the catalytic converter, the pre-set period of time being based on a pre-set temperature value sensed by the temperature sensor.

4. The exhaust after treatment system according to claim 1, wherein an internal volume between the first end of the exhaust outlet pipe section and the catalytic converter is adapted to accommodate the volume of gases flowed from the second end through the heater element during the pre-set period of time.

5. The exhaust after treatment system according to claim 1, further comprising a gas pump, which is with an inlet connected to the exhaust outlet pipe section at or near the first end and arranged to pump gas in an upstream direction from the second end towards the first end of the exhaust outlet pipe.

6. The exhaust after treatment system according to claim 5, wherein the gas pump is with an outlet connected to the section of the exhaust outlet pipe downstream from the heater element.

7. The exhaust after treatment system according to claim 1, further comprising a second catalytic converter, which is located downstream from the heater element, between said heater element and the second section of the exhaust outlet pipe.

8. The exhaust after treatment system according to claim 5, wherein the gas pump is a bi-directional pump which is further connected to the exhaust outlet pipe at a position between the electric heater element and a second catalytic converter and adapted to pump gases in the upstream direction from the heater element towards the first end as well as in a downstream direction from the heater element to the second catalytic converter.

9. The exhaust after treatment system according to claim 1, wherein a gas pump is connected to the exhaust outlet pipe via the vacuum canister.

10. The exhaust after treatment system according to claim 1, wherein the heater element is ring-shaped.

11. The exhaust after treatment system according to claim 1, wherein the heater element is provided with a catalyst coating.

12. A method of pre-heating a catalyst in an exhaust after treatment system, comprising a combustion engine with an outlet connected at a first end to a first exhaust outlet pipe section, a catalytic converter, a heater elements, a second outlet pipe section having an outlet opening at a second end, and a vacuum canister which is in fluid connection with a first section of the exhaust outlet pipe between the first end and the catalytic converter, said vacuum canister being arranged to store gases flowing from the second end towards the first end of the exhaust outlet pipe during a pre-set period of time and adapted to release the stored gases in a controlled manner when exhaust gases from the engine are flowing toward the outlet opening, the heater element being placed downstream of first pipe section when seen in a flow direction of the exhaust gases when the engine is running, the vacuum canister is provided with a control valve in the fluid connection between said canister and the exhaust outlet pipe, said control valve being adapted for releasing gases from the vacuum canister into the exhaust outlet pipe in a controlled manner, the pre-set period is when the vehicle is started and prior to the engine turning on, the method comprising: during the pre-set period, activating the heater element and flowing gases from the second outlet pipe section along the heater element and the catalytic converter into the first outlet pipe section, and opening the control valve in the first section of the exhaust outlet pipe such that gas is sucked into the canister.

* * * * *